July 9, 1957  J. F. GREATHOUSE  2,798,438
MEANS FOR SECURING A PUMP IMPELLER TO A SHAFT
Filed May 11, 1953
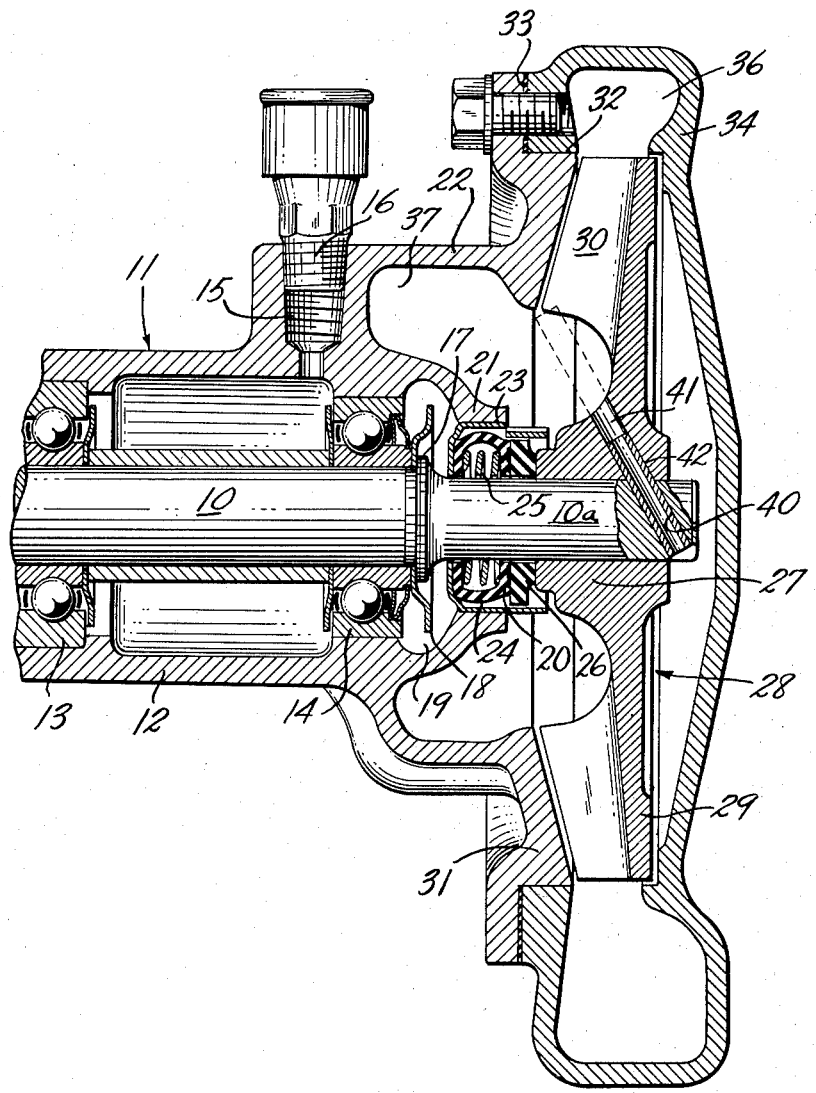
INVENTOR.
JACK F. GREATHOUSE
BY
*Campbell, Brumbaugh, Free & Graves*
*his* ATTORNEYS

United States Patent Office 2,798,438
Patented July 9, 1957

2,798,438

MEANS FOR SECURING A PUMP IMPELLER TO A SHAFT

Jack F. Greathouse, North Plainfield, N. J., assignor, by mesne assignments, to Mack Trucks, Inc., a corporation of New York Application May 11, 1953, Serial No. 354,259

4 Claims. (Cl. 103—112)

This invention relates to means for connecting a member to a rod or shaft, and it relates more particularly to means for connecting a driven or driving element such as an impeller for a pump or blower, a fan, a pulley, a gear or the like to a shaft or rod.

Many types of devices have a drive or driven shaft which is so positioned that it is difficult to secure a driving or driven element to the shaft with any of the conventional types of fastenings, such as for example, keys, cross-pins and the like. For example, some types of water pumps for automotive vehicles are provided with seals between the pump shaft and the pump housing which would leak if the shaft and the pump impeller were provided with key ways to receive a key. In other devices, the hub of the impeller, pulley or the like to be secured to the shaft is covered or inaccessible so that it is difficult to insert a cross-pin to secure the hub to the shaft. Moreover, even if the hub is accessible and the hub and shaft are predrilled to receive a cross-pin, it is difficult to align the holes therein, especially if the impeller or the like is press-fitted on the shaft, as is usually the case, because the hole in the shaft is covered and concealed by the member. Also, it is impractical, when the shaft or rod has been hardened, to use a hole in the hub of the impeller, pulley or the like as a guide for drilling the shaft to receive a cross-pin because the shaft or rod cannot be drilled readily.

The present invention provides a mechanism wherein an impeller for a pump or blower, a fan, a pulley, a gear or the like is press-fitted on a shaft or rod and secured thereto by means of a cross-pin without the need for bringing into alignment a hole in the shaft or rod and a hole in the member to be secured thereto and without drilling a hole in the shaft or rod after it has been hardened.

More particularly, the method involves the formation of a cross-bore in the rod or shaft, preferably prior to hardening the rod or shaft, the cross-bore being inclined at an acute angle to the rod or shaft, placing the member on the shaft in a position to cover one end of the bore, but leaving the other end uncovered or exposed and using the bore in the shaft as a guide to form or drill a hole in the member. The member can then be secured to the shaft or rod by driving a cross-pin into the aligned bore and hole. Due to the inclination of the bore in the shaft, one end of it is accessible to serve as a guide for a drill and to permit insertion of the cross-pin, even though the back of the member is inaccessible. Moreover, inasmuch as one end of the bore is always accessible, the pin can be driven out of the bore so that the member can be detached from the rod or shaft for servicing, replacement or repair, without removing the shaft from its supporting bearings.

For a better understanding of the present invention, reference may be had to the accompanying drawings in which, by way of illustration, the single figure discloses in longitudinal section and partially broken away, an impeller type pump for an automotive vehicle in which the impeller is secured to the pump shaft in accordance with the present invention.

While the invention is illustrated in the drawing as applied to a water pump for the cooling system of an automotive vehicle, it will be understood that it is equally applicable to such other devices as centrifugal pumps or blowers of various types, impeller type blowers or pumps for low or high velocity fluid systems, for securing pulleys, gears and the like to drive or driven shafts and for many other similar or equivalent purposes.

As illustrated in the drawing, the pump is provided with a pump shaft 10 which is formed of steel and may be suitably hardened such as, for example, by case hardening or in any other desired way. A shaft 10 is mounted in the pump casing 11 which may be a separate casing for mounting on the engine or it may be formed as a part of the engine block, as may be desired. The pump casing 11 includes a hollow cylindrical portion 12 in which are mounted a pair of anti-friction bearings 13 and 14 for receiving the shaft 10 rotatably. The cylindrical portion 12 of the housing has a lateral passage 15 for a grease or oil cup 16 by means of which lubricant is supplied to the bearings 13 and 14.

The pump shaft 10 is provided with a shoulder 17 to hold a slinger ring 18 against the inner race of the bearing 14 so that any grease tending to escape from the bearing is thrown outwardly into an enlarged annular recess 19 in the pump casing to the right of the bearing 14.

A reduced diameter portion 10a of the shaft also extends through a cartridge type seal 20 which is carried by an annular flange 21 extending inwardly from an enlarged section 22 of the casing 11. The fluid seal 20 is of a conventional type and includes a thin metal cap 23 mounted in the flange 21 and receiving a flexible sealing member 24 of U-shaped cross section which is expanded axially by means of a spring 25 surrounding the shaft 10. The right-hand flange of the seal 20 bears against a seal 26 formed of a graphited material which bears against the inner end of the hub 27 of the pump impeller 28.

The hub of the pump impeller has a snug or tight fit on the right-hand end 10a of the shaft 10. The hub 27 has a disk 29 extending outwardly from it which carries the impeller vanes 30. The impeller vanes are in closely spaced relation to an outwardly flared portion 31 of the pump housing which has an outwardly facing shoulder 32 and a radially extending shoulder 33 for engaging the edge of a cover or end plate 34 of the pump. The inner surfaces of the cover 34 and the flared portion 31 of the casing conform closely in shape to the cross-section of the impeller. The outer periphery of the end plate 34 is provided with a spiral discharge chamber 36 through which liquid is discharged by the pump impeller 28. Liquid flows to the inner edges of the impeller vanes through an inlet port (not shown) communicating with the cavity 37.

The above-described pump construction is conventional and it can be modified in accordance with requirements.

The novel feature of the pump illustrated in the drawing is the means by which the impeller 28 is secured on the shaft 10. During the manufacture of the shaft 10 and, preferably before it is hardened, a bore 40 is drilled or otherwise formed in the shaft at an acute angle to the axis of the shaft. The shaft may then be hardened to withstand the abrasion and erosion to which it is subjected in use. The impeller 28 is pressed on the end of the shaft until the inner end, i. e. the left-hand end of the bore 40, as viewed in the figure of the drawing, is covered by the hub 27 of the impeller and the outer or right-hand end of the bore 40 is uncovered or exposed. Using the bore 40 as a guide, a drill of the same size may be inserted into the bore 40 and an aligned hole 41 is then drilled through the hub 27 of the impeller. The drill is then withdrawn and a cross-pin 42 of self-retaining type is driven into the bore 40 through the exposed outer end of the bore and into the hole 41 in the impeller, thereby securing the shaft and the impeller together and preventing relative rotation thereof.

As illustrated, the pin 42 preferably is hollow so that the pressures on opposite sides of the impeller are equalized. The hollow pin permits flow of fluid from one side of the impeller to another.

If, for any reason, the impeller must be removed from the shaft, a punch may be inserted in the outer end of the bore 40 and used to drive the pin 42 through the hole 41 until the pin is disengaged from the shaft portion 10a. The impeller can then be removed from the shaft and the pin is driven out of the hole 41 in the impeller.

If the same impeller or a different impeller is to be replaced on the shaft, it can be forced on the end of the shaft without regard to the alignment of the bore 40 and the hole 41 and a new hole is drilled through the impeller hub 27 to receive the cross-pin 42. In this way, all need for relative twisting of the impeller and the shaft is avoided; a marked advantage when the impeller is press-fitted on the shaft, thereby allowing easy replacement of the old or a new impeller on the shaft.

From the preceding description, it will be understood that the invention provides a simple and highly effective means and method for releasably securing a member on a shaft or rod, even when the shaft or rod has been hardened to such an extent that drilling thereof is difficult or impossible.

As indicated above, the connecting means and the method embodying the invention are useful in many other devices than pumps and, accordingly, the form of the invention described herein should be considered as illustrative and not as limiting the following claims.

I claim:

1. An impeller mount for a pump comprising a shaft having a bore extending through it, said bore being inclined at an acute angle to the axis of said shaft, an impeller having a hub mounted on said shaft, said impeller hub overlying and having one end thereof covering one end of said bore, the opposite end of the bore being exposed at the other end of said impeller hub, said impeller hub having an inclined hole therethrough in alignment with said bore, and a pin engaging in said hole and said bore and securing said impeller to said shaft.

2. An impeller mount for a pump comprising a shaft having a bore extending through it at an acute angle to the axis of said shaft, an impeller on said shaft, said impeller having a hub and a radially extending row of vanes, said impeller being positioned on said shaft to expose one end of said bore and with its hub overlying the other end of said bore, said bore having its ends on opposite sides of said row of vanes, said hub having a hole therethrough in alignment with said bore, and a pin fitting said hole and bore to secure said impeller to said shaft, said pin being accessible through the exposed end of said bore to enable it to be driven out of the bore through said hole to release said impeller from said shaft.

3. A mounting for securing a member to a rod, said rod having a bore of substantially uniform diameter extending through it at an acute angle to the axis of said rod, a member mounted on said rod in a position to expose one end of said bore at one end of said member and having an opposite end portion overlying the other end of said bore, said opposite end portion of said member having an inclined hole of substantially the same diameter as said bore therethrough aligned with said bore, and a pin fitting in said hole and said bore and securing the member to the rod, said pin being accessible through the exposed end of said bore to enable the pin to be driven out of the bore through said hole to release said member from said rod.

4. An impeller mount for a pump comprising a shaft having a bore extending through it at an acute angle to the axis of said shaft, an impeller on said shaft, said impeller having vanes and a hub, said impeller being positioned on said shaft to expose one end of said bore and with its hub overlying the other end of said bore, said hub having a hole therethrough in alignment with said bore, a pin fitting said hole and bore to secure said impeller to said shaft, said pin being tubular to equalize fluid pressures on opposite sides of said impeller and being accessible through the exposed end of said bore to enable it to be driven out of the bore through said hole to release said impeller from said shaft.

References Cited in the file of this patent

UNITED STATES PATENTS

| 1,326,692 | Rogatchoff | Dec. 30, 1919 |
| 2,156,692 | Hixon | May 2, 1939 |
| 2,397,585 | Anderson | Apr. 2, 1946 |
| 2,431,249 | Heppner | Nov. 18, 1947 |
| 2,542,896 | Brady, Jr. | Feb. 20, 1951 |
| 2,621,603 | Thomas | Dec. 16, 1952 |
| 2,651,494 | Persson | Sept. 8, 1953 |

FOREIGN PATENTS

| 776 | Great Britain | Jan. 15, 1889 |
| 202,042 | Germany | Dec. 5, 1907 |
| 618,011 | Great Britain | Feb. 15, 1949 |